United States Patent [19]

Cozzi

[11] Patent Number: 5,617,013
[45] Date of Patent: Apr. 1, 1997

[54] POWER SUPPLY WITH POWER FACTOR CORRECTION AND PROTECTION AGAINST FAILURES OF THE POWER FACTOR CORRECTION

[75] Inventor: Daniele Cozzi, Nerviano-Milan, Italy

[73] Assignee: Bull HN Information Systems Italia S.p.A., Turin, Italy

[21] Appl. No.: 409,187

[22] Filed: Mar. 23, 1995

[30] Foreign Application Priority Data

Jun. 13, 1994 [EP] European Pat. Off. .............. 94830289

[51] Int. Cl.$^6$ ............................................. G05F 1/613
[52] U.S. Cl. .......................... 323/222; 323/207; 323/282
[58] Field of Search .................................... 323/207, 210, 323/222, 282, 284

[56] References Cited

U.S. PATENT DOCUMENTS

| | | | |
|---|---|---|---|
| 4,316,136 | 2/1982 | Saxarra et al. | 323/282 |
| 5,001,620 | 3/1991 | Smith | 323/222 |
| 5,073,850 | 12/1991 | Pace | 323/222 |
| 5,134,355 | 7/1992 | Hastings | 323/222 |
| 5,180,964 | 1/1993 | Ewing | 323/222 |
| 5,359,274 | 10/1994 | Bandel | 323/207 |
| 5,359,281 | 10/1994 | Barrow et al. | 323/284 |
| 5,418,709 | 5/1995 | Lukemire | 323/282 |
| 5,495,164 | 2/1996 | Heng | 323/222 |
| 5,502,370 | 3/1996 | Hall et al. | 323/284 |
| 5,508,602 | 4/1996 | Borgato et al. | 323/222 |

FOREIGN PATENT DOCUMENTS

A-0573828A2 12/1993 European Pat. Off. ....... H02M 3/156

OTHER PUBLICATIONS

'Linear Integrated circuits data and applications handbook' Dec. 1990, Unitrode Corp., Merrimack, USA Application note U-125: "Power factor correction with the UC3854" by Claudio de sa e Silva (pp. 9-287-9-296).
Electronics & Wireless World, vol. 99, No. 1693, Dec. 1993, Surrey GB pp. 1034-1035, XP000421031 'Power factor controller'.

*Primary Examiner*—Jeffrey L. Sterrett
*Attorney, Agent, or Firm*—Rosen, Dainow & Jacobs Limited Liability Partnership

[57] ABSTRACT

In a power supply with a boost pre-regulator and power factor correction devices the voltage induced in an auxiliary winding magnetically coupled to the inductor of the pre-regulator and rectified by a diode bridge charges an integrating capacitor, shunted by a discharging resistor, to a voltage which compared with predetermined reference voltages allows to detect and to signal anomalous operative conditions, such as overload or unoperativeness of the power factor correction devices for the execution of suitable intervention procedures.

5 Claims, 5 Drawing Sheets

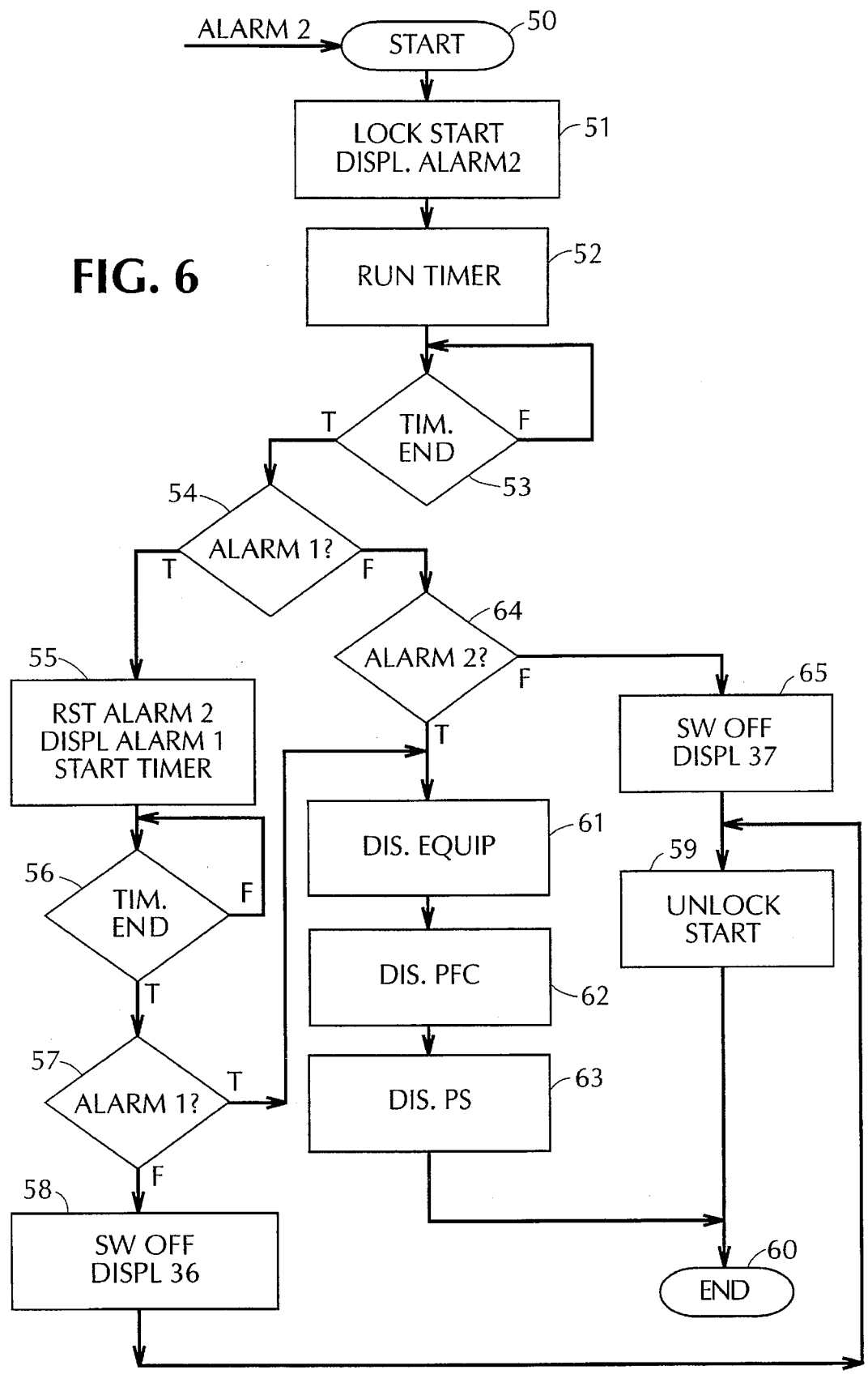

POWER SUPPLY WITH POWER FACTOR CORRECTION AND PROTECTION AGAINST FAILURES OF THE POWER FACTOR CORRECTION

FIELD OF THE INVENTION

The present invention relates to an electronic equipment power supply having power factor correction and protection against failures of the power factor correction.

BACKGROUND OF THE INVENTION

In an electric power distribution system with alternated voltages and currents, the power factor is the ratio of real power (Watts) feeding a load to the apparent power (Volt-Amperes) absorbed thereby.

The optimum value for this ratio is unity, a value which is obtained only when the line current is sinusoidal and in phase with the line voltage, (which is sinusoidal).

This means that any current component in quadrature with the fundamental and any component at frequency other than the fundamental, cannot carry any real power to the load.

However these components contribute to total line losses and because they add to the active current actually required by the equipment, they mandate the use of heavier wiring and circuit breakers.

In the past, the main cause of low power factor was the inductive characteristic of the loads, such as electric motors and could be corrected at large extent by suitable rephasing capacitors.

With the advent of the electronic industry and the enormous increase of equipment incorporating voltage regulators having rectifiers, followed by capacitive input filters, the nature of the problem has changed.

The current drawn by these circuits is distinctly non sinusoidal with relevant armonic components.

The resulting power factor may be as low as 0,5 and, if the power involved is higher than some hundreds of watts, cost considerations alone make it imperative to search for the use of arrangements which improve the power factor.

In addition recent regulations impose that the power factor of the equipment cannot drop below predetermined limits and that the armonics contents of the drawn current be limited too.

For these reasons power factor pre-regulators have been developed for feeding post regulators with a current pulsed at high-frequency (in the order of 50–100 Khz) and sinusoidally modulated in phase with the powering voltage.

The propagation upstream of the high frequency armonic components can be easily filtered.

In addition the pre-regulators can perform as adapters to differing main voltages and provide an output at a pre-regulated voltage of predetermined value which by means of DC/DC converters is converted in one or more DC voltages regulated with very high precision.

In general such pre-regulators are structured as a conversion power stage of the "boost" type, or voltage elevator, comprising an inductor fed by a rectified voltage through a periodically closed switch.

When the switch is closed, the inductor is charged and stores magnetic energy.

When the switch is open, the inductor discharges, though a diode, on an output capacitor of the pre-regulator and transfers to it the stored magnetic energy.

An example of a pre-regulator of this kind, and of an integrated circuit which performs all the control functions of the pre-regulator is described in the document: Application Note by Claudio de Sa e Silva "power Factor Correction with the UC3854" published by the firm UNITRODE as well as in the UNITRODE technical specifications of the UC3854 component, This component comprises overcurrent protection circuits which temporarily block its operation when the current drawn from the pre-regulator exceeds a predetermined value, as it may result from overloads or short circuits, but it does not provide any overload or failure to operate indication which could be used as an alarm signal and control signal for switching off the power supply or the whole electric equipment, power supply included, according to suitably programmed procedures.

It is clear that during the time intervals in which the pre-regulator does not operate, the power supply, if not switched off, continues to operate without complying with the power factor and distortion limits imposed by the regulations.

If this behaviour can be tolerated for short time intervals, it is unacceptable at long term and in addition to the non compliance with the regulation may be of detriment to the performances of the power supply and the equipment powered therefrom.

It may be cause of further failures and misfunctioning. The same inconvenient occur if, due to an internal failure the pre-regulator permanently stops to operate.

OBJECTS OF THE INVENTION

These limitations are overcome by the power supply with pre-regulator, power factor corrector and protection against failure of the. pre-regulator and overloads which is the object of the present invention.

The power supply is provided with circuits for detecting the non operation of the pre-regulator and for providing a signal which, depending on specific needs, may be used as an alarm signal or as a control signal for switching off the power supply.

SUMMARY OF THE INVENTION

According to the invention these results are achieved by providing an auxiliary winding magnetically coupled to the pre-regulator inductor for generating a voltage proportional to the voltage at the inductor terminals, a diode bridge for rectifying the generated voltage, the rectified voltage being input to a capacitor, slowly decaying on a shunt resistor and providing with its changes a measurement signal indicating the correct operation of the pre-regulator or the saturation or demagnetization of the inductor consequent to the non operation of the pre-regulator.

According to a further aspect of the present invention there is also provided a diode for by-passing the inductor, the diode being forward biased when the output voltage of the pre-regulator is lesser than the input voltage, thus preventing inductor saturation, which inductor could be damaged by feeding overcurrent pulses in these conditions.

According to a further aspect of the present invention the protection against failures of the power factor corrector comprises two comparators for comparing the measurement signal with two predetermined reference voltages and logical and timing devices for detecting the time instant at which the measurement signals equals the one or the other of the two reference voltages and the time interval which divides such instants.

From this information it is possible to discriminate if the change in the measurement signal is due to non operation of the pre-regulator or to the intervention of the load limiting protection of the pre-regulator in order to allow for a different management of the two events.

BRIEF DESCRIPTION OF THE DRAWINGS

The features and the advantages of the invention will result more clearly from the following description of a preferred form of embodiment and from the enclosed drawings where:

FIG. 6 shows in logical flow diagram the procedures performed by the protection devices at the occurrence of overloads or misfunctioning.

DESCRIPTION OF A PREFERRED EMBODIMENT

Figure 1:
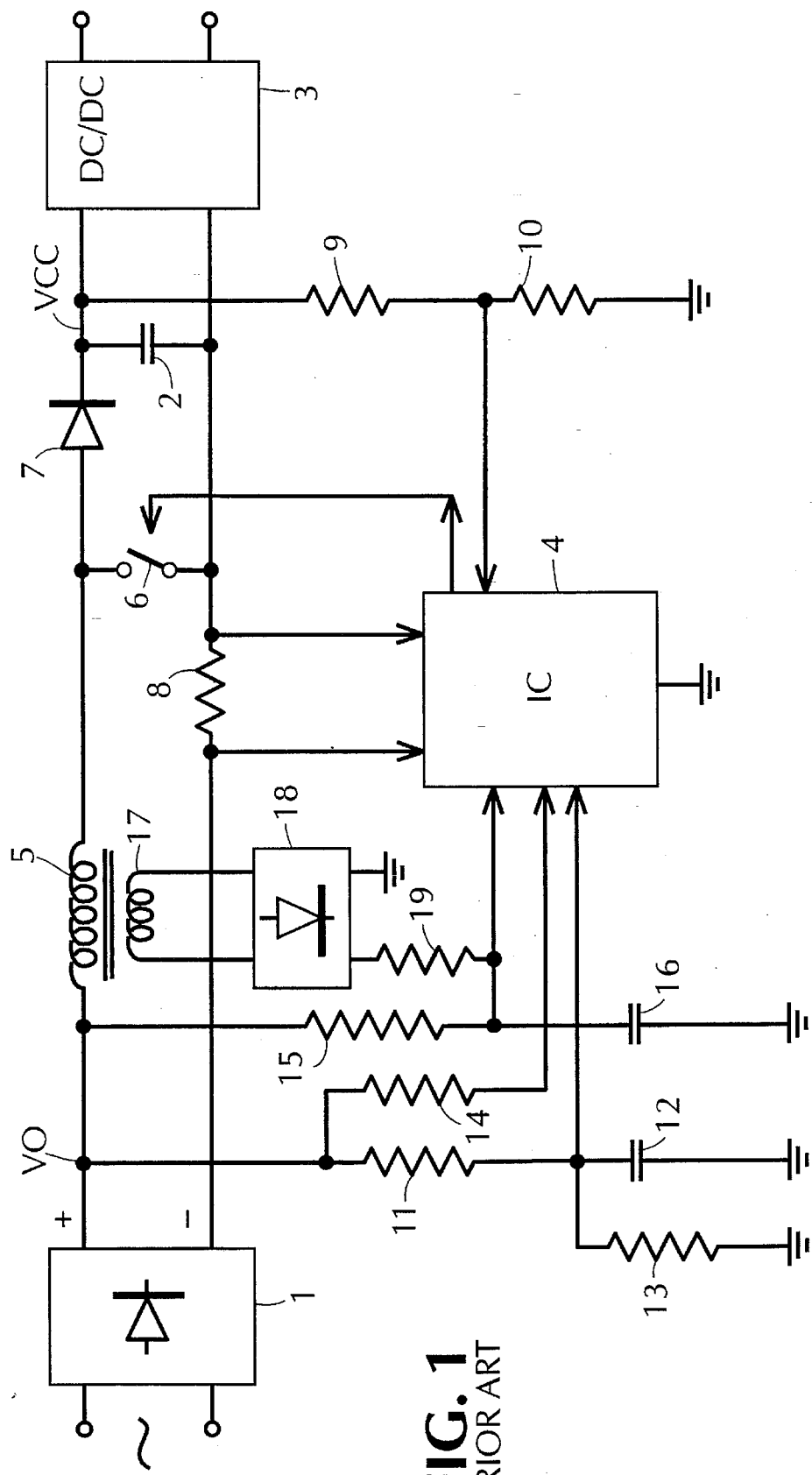
FIG. 1 is an electrical block diagram of a prior art power supply with power factor correction.

With reference to FIG. 1 a power supply commonly used in electronic equipment and having power factor correction comprises a diode bridge 1 fed by the main AC voltage, a buffer capacitor 2, a DC/DC converter regulator 33 having one or more output and power factor correction circuits.

These circuits basically comprise an integrated circuit 4 which modulate the pulse width of an output signal, an inductor/transformer 5, an electronic switch 6 and a diode 7.

The positive output terminal of the diode bridge 1 is coupled to one terminal of inductor 5 the other terminal of which is coupled to the diode 7 anode.

The diode 7 cathode is coupled to the positive powering input of the load, which in FIG. 1 consists in the DC/DC converter regulator 3.

The negative output terminal of the diode bridge 1 is coupled, through a current measurement resistor 8 to the negative input of converter 3, suitably grounded.

The switch 6 is coupled so as to ground, when closed, the diode 7 anode.

The capacitor 2 is coupled between the diode 7 cathode and ground.

The charge voltage of capacitor 2, detected by means of a voltage divider formed by two resistors 9,10 is input to the integrated circuit 4 as a feedback signal which is compared, in the circuit 4, with a reference voltage to modulate the pulse width of a periodic control signal switching on the switch 6.

Missing any other control loop, the system formed by bridge 1, inductor 5, switch 6, diode 7, capacitor 2 and by the control circuit 4 is a classic voltage switching regulator of the "boost" type, which allows to obtain a voltage charge of capacitor 2 greater than the peak value of the rectified, sinusoidally pulsing voltage at the output of bridge 1.

By periodically closing the switch 6, a current is established in inductor 5 which current increases according to the well known law $V=L\ di/dt$, where L is the inductance of inductor 5 and $V=|VAC\ sen\ wt|$ is a pulsed voltage in output from the diode bridge.

Obviously the voltage drop in the bridge 1 and resistor 8 is neglected.

When the switch 6 is open the inductor current does not cease abruptly but gradually decreases and develops a self induced e.m.f. which adds to the pulsing voltage present at the bridge output, forward bias the diode 7 and allows the current to flow towards capacitor 2, charging it at a predetermined voltage level, for instance 380 V.

Missing other control loops, the described system tends to concentrate the power drawing in the time intervals in which the pulsing voltage in output from the bridge is increasing and has a high value, very close to its peak, with a remarkable distortion and power factor lowering.

The power factor correction circuits overcome this inconvenience by modulating the switching on time of switch 6, not only as a function of the voltage VCC at which capacitor 2 is charged, but also as a function of the load current, of the instantaneous voltage at the output of bridge 1 and of the square mean value of the voltage at the output of bridge 1.

The integrated control circuit 4, for instance the UNITRODE UC 3854 is provided to this purpose with inputs to receive these signals and with circuits for their processing.

Resistor 8 provides a voltage proportional to the load current to the control circuit 8.

An integrating network formed by a resistor 11, a capacitor 12, series connected to resistor 11 and a resistor 13 shunting capacitor 12, the network being coupled between the positive output of bridge 1 and ground develops, at the node common to resistor 11 and capacitor 12, a voltage proportional to the square mean value of the voltage in output from bridge 1.

This voltage is input to circuit 4.

A resistor 14 connects the positive output of bridge 1 to an input of circuit 4 and supplies to the circuit 4 a current proportional to the instantaneous value of the voltage in output from bridge 1.

In order to power the integrated control circuit 4, its manufacturer suggests, as shown in FIG. 1, to use the voltage in output from bridge 1, lowered and filtered by an RC network formed by a resistor 15 and a capacitor 16, complementing the powering provided by the RC network, when the power factor correction circuit is operative, with power provided by an auxiliary winding 17 magnetically coupled to inductor 5 and electrically connected to capacitor 16 through a diode bridge 18 and a resistor 19, In order to achieve an effective power factor correction the switch 6 must be switched on and off at a frequency much higher than the pulsing frequency of the powering voltage.

For example the control circuit UC 3854 operates at a nominal frequency of 50 Khz.

The control circuit 4 is provided with soft start circuit elements and overload protection circuits.

These last switch off the switch 6 if the current drawn by the pre-regulator and measured by resistor 8 exceeds a predetermined value.

This system, known in the art, has the already mentioned disadvantages of not providing any misfunction indication and/or failure of the pre-regulator.

For example if the circuit 4 stops to operate and switch 6 is permanently switched off, the inductor 5 demagnetizes and stops to pump current towards capacitor 2, which gradually discharges.

When the charge voltage of capacitor 2 drops below the peak value of the voltage VO in output from bridge 1, the inductor 5 is crossed by current pulses at twice the frequency of the main.

These pulses charge capacitor 2 but have duration and intensity much higher than the one which can be sustained by inductor 5, Therefore the inductor 5 is saturated and not only the pre-regulator does not perform its power factor correction task: there is also the risk that inductor 5 and the whole power supply get damaged.

The same problem occurs if due to overload the circuit 4 enters in a current limiting state.

The current limitation primarily occurs when the voltage VO has the highest values and causes a distortion of the drained current waveform which is clipped, with consequent generation of harmonics and increasing of the power factor.

In this case the inductor 5 if properly sized, is not subject to saturation but the operation of the power supply at the limits of the operative range, if continued in time, may be a failure cause.

Figure 2:
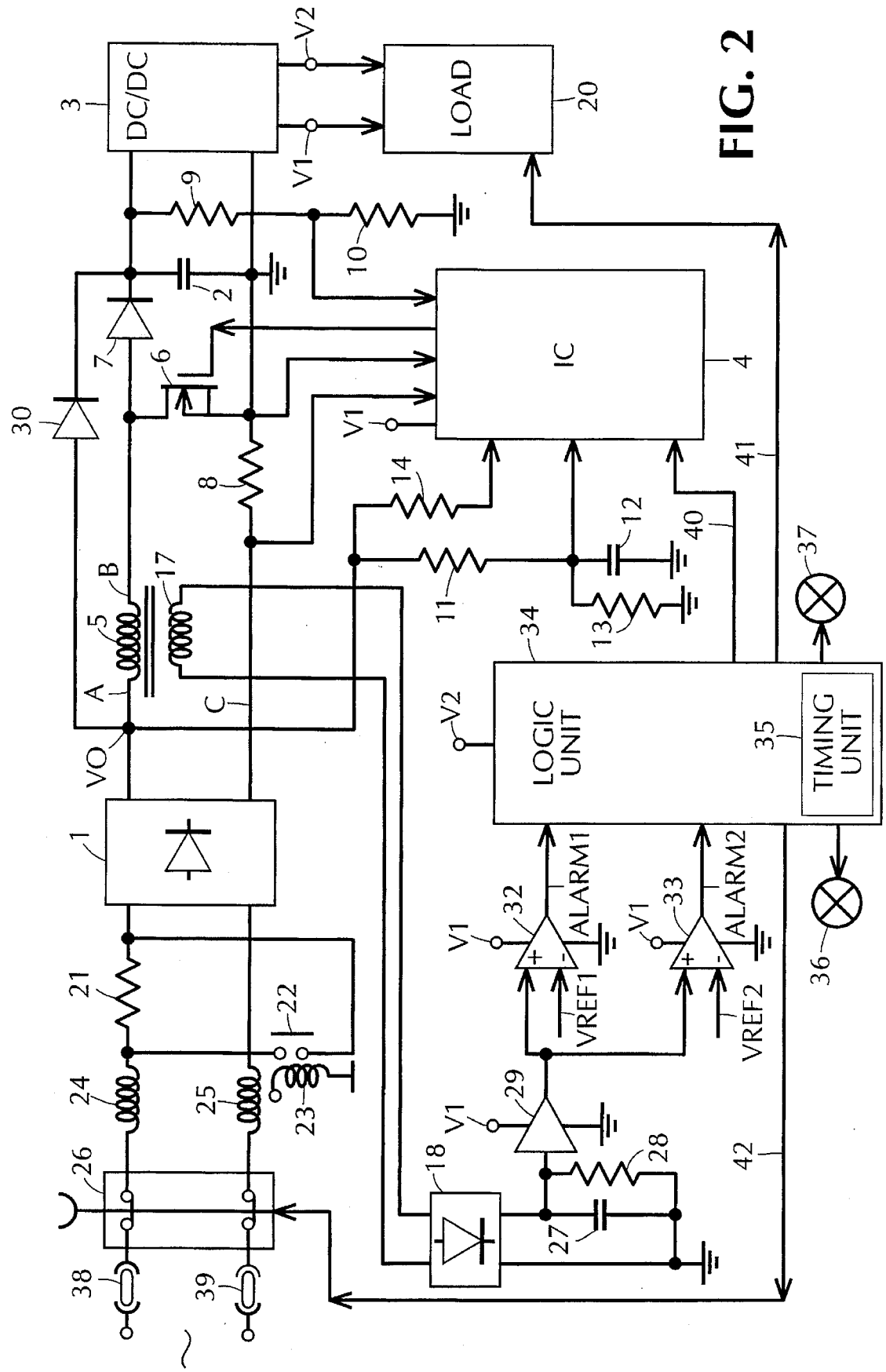
FIG. 2 is an electrical block diagram of a power supply with power factor correction and protection against the failures of the power factor correction circuits according to a preferred form of embodiment in accordance with the present invention.

FIG. 2 shows a power supply implemented in accordance with the present invention, which differs from the one of FIG. 1 because protection devices are provided against failures of the power factor correction pre-regulation.

The elements functionally equivalent to those shown in FIG. 1 are referenced by the same numerals.

Advantageously the switch 6 is a power MOSFET and the post regulator 3, known per se, generates two continuous voltages V1, V2, powering electronic equipment or load 20 (for example a data processing system), the integrated circuit 4, the winding 23 of an electromagnetic switch 22 and the protection circuits, in the following described more in detail.

For sake of completeness FIG. 2 shows that the power supply is coupled to the AC main, for instance 220 V, 50 Hz, through a main switch 26, which is both manually operated, both automatically switched off on control from the protection circuits, through a pair of protection fuses 38, 39 and through a pair of inductive filters 24, 25.

A resistor 21 upstream of the diode bridge 1, limits the start current at the switching on and is shorted by closing the switch 23 when the voltage V1 generated by the power supply, is present.

All these elements are known in the prior art.

At the switching on, the continuous current supplied by the bridge 1 and limited by the resistor 21 flows in the inductor 5, the diode 7 and charges the capacitor 2 at a voltage level VCC equal to the peak value of the voltage in output from the bridge 1.

In these conditions the post regulator is powered and generates voltage V1, which activates switch 22, the integrated circuit 4 and the protection circuits in a suitable sequence.

The protection circuits comprise an auxiliary winding 17, magnetically coupled to the inductor 5, a diode bridge 18, coupled to the terminals of winding 17, a capacitor 27, fed by the rectified voltage in output from bridge 18, a resistor 28 shunting capacitor 27 and a buffer 29.

An armature of capacitor 27 is grounded and the other is coupled to the input of buffer 29, whose output is coupled to the inverting input of a first comparator 32, powered by voltage V1.

A first reference voltage VREF1 is input to the non inverting input of comparator 32.

Advantageously but non necessarily, the buffer 29 output is further coupled to the inverting input of a second comparator 33, which receives a second reference voltage VREF2 at its non inverting input.

The outputs of comparators 32, 33 are coupled to inputs of a logic unit 34 which, depending on the status of comparators 32, 33 activates light and/or acoustic signals 36, 37 and forwards suitable control signals to the electric equipment 20, to the integrated circuit 4 and to the switch 26.

Unit 34 is powered by voltage V2, which, for sake of simplicity is assumed as available at the same time of V1.

The operation of the power supply and the related protection circuits will now be explained with the aid of the timing diagrams of FIG. 3a–d.

At switch on, missing voltages V1 and V2 the circuits and the unit 34 are inactive.

Comparator 2 is charged at first voltage level which for sake of simplicity is assumed to be equal to the peak voltage of the main voltage.

In these conditions the converter 3 can operate and generates voltages V1 and V2 powering circuit 4 and logic unit 34 which enables, the operation of circuit 4 through a lead 40.

Unit 34 comprises a timing unit 35 which, among others, defines a starting time interval during which unit 34 does not take into account the level of signals received from comparator 32 and 33.

Circuit 4 then begins to switch on and off the switch 6 at high frequency in the order of 50 KHz and modulates the duration of the switching on pulses as a function of the charge voltage VCC of capacitor 2, of the instantaneous value of voltage VO in output from bridge 1, of the square mean value of VO and of the current supplied by the bridge.

Figure 3A:
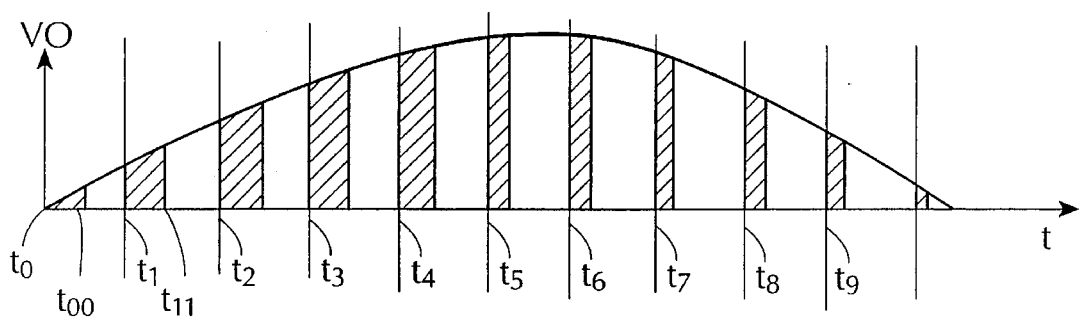
FIGS. 3a–d are a timing diagrams showing the voltage at some points of the power supply of FIG. 2 and the drawn current resulting from the power factor correction.

FIG. 3a shows a half wave of voltage VO which extends (for a main voltage at 50 Hz) over a time interval of 10 msec.

The dashed areas of FIG. 3a shows the voltage pulses periodically applied (at instants t0, t1, t2 ... t9) to inductor 5 by switching on switch 6.

The period of these pulses is very short, in the order of 20 μsec, so that in the course of half a wave of voltage VO, about 500 pulses are applied.

In FIG. 3a the pulses are shown as having a much greater period for clearness purpose.

Figure 3B:
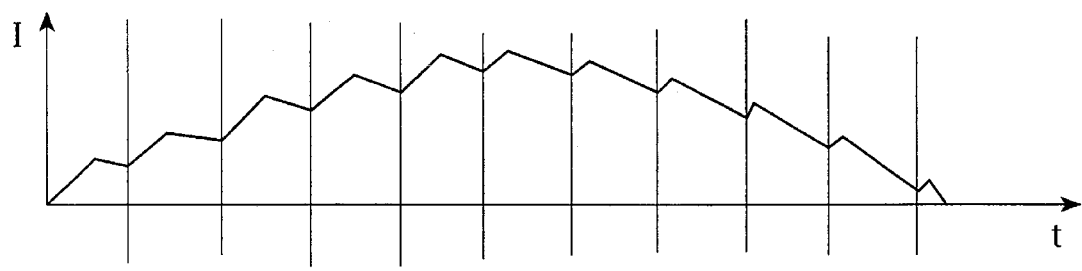

FIG. 3b shows the current supplied by bridge 1 and detected by resistor 8.

Owing to a first switching on of switch 6, at time to, an increasing current ramp is launched in the inductor 5 which continues to magnetize the inductor until time instant too, at which switch 6 is switched off.

Beginning with instant too the current decreases and develops a sef induced e.m.f. which brings terminal 13 of the inductor to a level sufficing to forward bias the diode 7, so that the current supplied by bridge 1, through inductor 5, feeds capacitor 2 and the load 3.

Beginning with instant t1, the switch 6 is again switched on and the residual current in inductor 5 is incremented again until instant t11. The process is repeated indefinitely.

A current i results which, but for a neglectable ripple at the switching on frequency of switch 6, has a sinusoidal shape in phase with the voltage half wave.

Figure 3C:
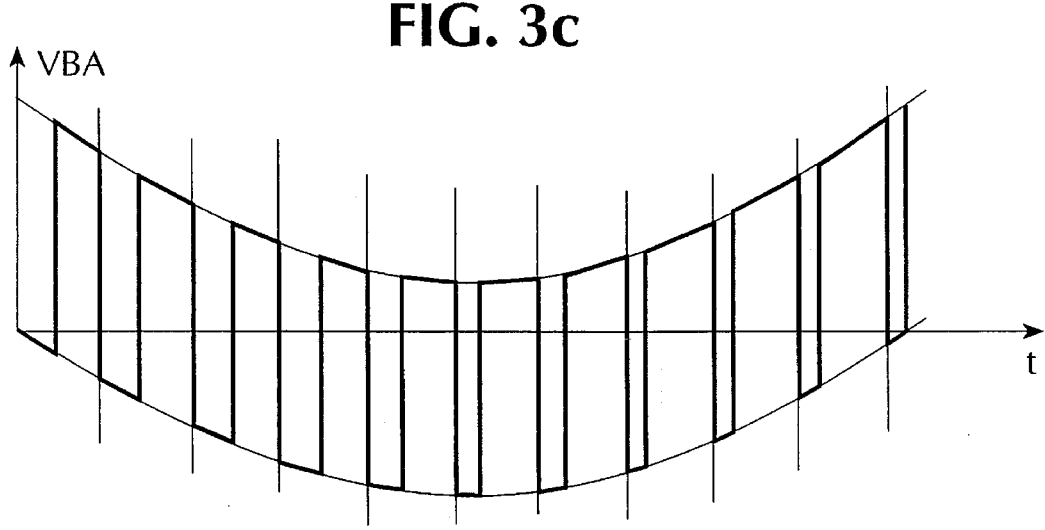

FIG. 3c shows the voltage VBA applied to the terminals AB of the inductor or self induced therein, related to ground.

When the switch 6 is switched on, the voltage VBA is clearly VBA =–VO=–VOMAX ¦sen wt¦.

When the switch 6 is switched off, the self induced e.m.f. is necessarily equal to the charge voltage of capacitor 2 less the instantaneous voltage supplied by the bridge 1, e.g. VBA=VCC–VO=VCC–VOMAX¦sen wt¦.

It is therefore clear that at terminals AB an alternate square wave voltage is present having an amplitude, peak to peak, equal to VCC and frequency in the order of 50 kHz.

VCC is greater than VOMAX and equal, for example to 380 v.

To this voltage a negative sinusoidal half wave modulation is superimposed having a period 10 msec and amplitude equal to VOMAX.

Since the auxiliary winding 17 is magnetically coupled to inductor 5, an alternate voltage having the same wave form is theoretically present at its terminal.

The voltage has amplitude peak to peak equal to $$VAUX = VCC \cdot n17/n5$$

where n17/n5 is the turns ration of winding 17 and inductor 5.

Figure 3D:
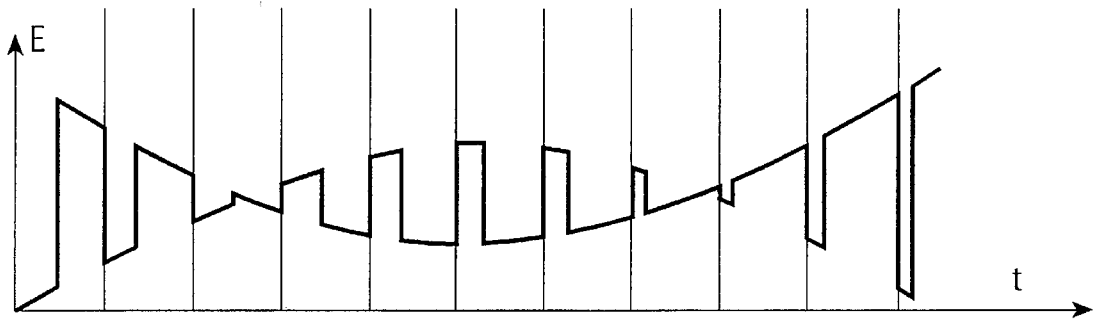

This voltage is applied to the diode bridge 18 and is available at its output as a rectified charging voltage of capacitor 27, modulated according to FIG. 3d.

It is clear that in a theoretical ideal case the capacitor would be charged at voltage VAUX=VCC·n17/n5.

In practice, owing to the resistance of winding 17, to the leakage inductance and to the resistance of resistor 28, discharging capacitor 27, the system formed by winding 17 and capacitor 27 operates as an integrating network and the charge voltage of capacitor 27 is somehow lesser and affected by some ripple.

In any event, when the pre-regulator is operative, it is somehow higher than the difference between voltages VCC·n17/n5 and VOMAX n17/n5 even if its average value decreases when the power supply load increases.

Figure 4:
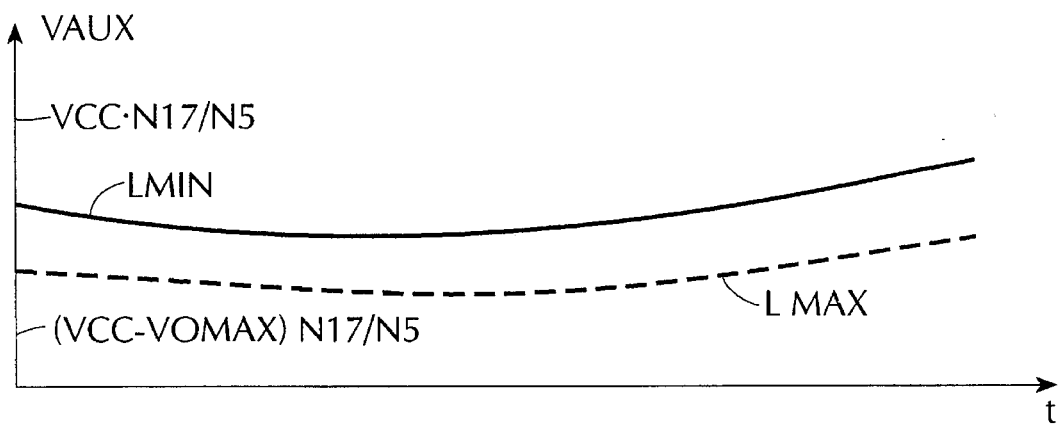
FIG. 4 shows in timing diagram the variation range of a voltage signal detected to identify overloads and misfunctioning of the correction circuits.

FIG. 4 shows in qualitative timing diagram, over a period of the half wave VO, the excursion range of voltage VAUX for load conditions spanning from a minimum (diagram LMIN) to an admissible maximum (diagram LMAX) related to voltages VCC n17/n5 and (VCC–VOMAX)·n17/n5.

The charged state of capacitor 27 provides therefore an indication of the pre-regulator correct operation.

It is now considered what happens if the pre-regulator stops to operate, due to a failure and switch 6 is kept permanently open.

The current flowing in inductor 5 decreases to 0 in the course of a few milliseconds and the inductor completely demagnetizes, and ceases to feed capacitor 2 which gradually discharges, owing to the power drained by load 3, from voltage VCC to the peak voltage VOMAX.

When the inductor is demagnetized there is no induced voltage in the winding 17.

Therefore capacitor 27 gradually discharges on resistor 28 with a time constant RC which may be suitably predetermined and is preferably in the order of 0,1–0,5 sec.

The charge voltage of capacitor 27 is input to buffer 29 whose output is coupled to the inverting input of comparator 32.

Therefore if the charge voltage of capacitor 27 drops to a predetermined level, related to the reference voltage VREF1 input to comparator 32, the output of comparator 32, normally at a first logic/electrical level changes to a second logic/electrical level and signals to the logic unit 34, by asserting a signal ALARM1, that the circuit 4 is inactive and that suitable intervention is required.

This may consist in the simple signalling of the misfunction by activation of a light signal 36 or an acoustic one, or in the activation of a programmed switching off of the equipment, consisting for instance in waiting for a predetermined time period, imposed by the timing unit 35 and checking that the inoperative state of circuit 4 is persisting and not a temporary one.

If the inoperative state of circuit 4 persists, the procedure may continue and controls, with signals applied to leads 41, the deactivation of the electronic equipment.

In case of electronic equipment consisting in a data processing system, the deactivation may be conditional to the conclusion of processes and or to the data saving.

To this, the disconnection of the power supply from the main may follow, the disconnection being controlled by a switching off signal sent to switch 6 through leads 42.

In fact the failure of circuit 4 to operate does not have dramatic consequences at short term, the most immediate one being the power supply failure to operate at high power factor.

Quite different is the case of power supply overload, which, if protracted in time, requires a timely actuated protective intervention, possibly according to predetermined procedures and not by simply deactivating the power supply, Overload of the power supply, with the consequent intervention of the control circuit 4 and current limitation, has the effect to alter the wave shape of the drawn current.

When voltage VO is rising the switch 6 is mostly closed (switched on) so as to drive in inductor 5 an increasing current which raises fast to the maximum admissible level.

At this point, even if regulation requirement would impose a further current increase, the switch 6 is switched off the whole time needed by the current, which continues to flow in inductor 5, to drop below the hysteresis threshold of the overcurrent detecting circuits.

The switching off keeps constant the maximum power input to the post regulator,

The switch off time interval increases with the overload and extends over a relevant portion of the half wave period of the powering voltage VO.

In the tail portion of the VO voltage half way, the circuit 4 in order to make up for the lesser current drawn in the preceding phase, keeps the switch 6 mostly on.

Figure 5:
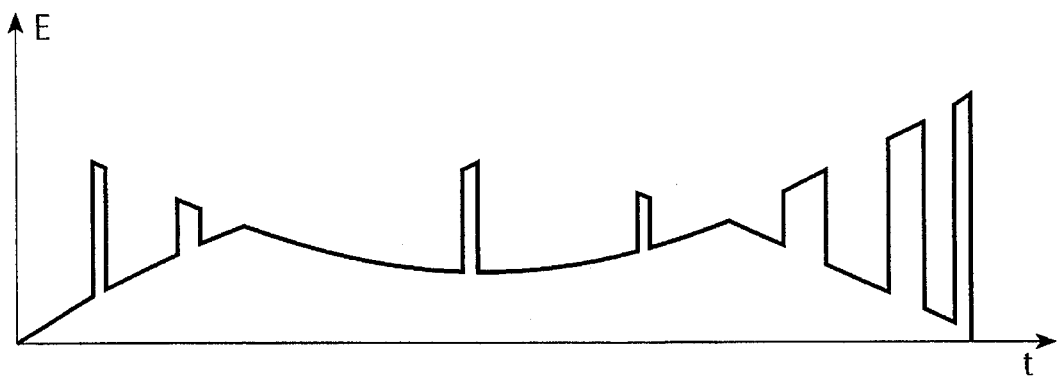
FIG. 5 shows in timing diagram the voltage induced in an auxiliary winding of the protection devices, under overload conditions.

The voltage induced in winding 17 and rectified by bridge 18 has therefore the shape shown in FIG. 5 and loads capacitor 27 at a voltage level lower than the value range related to normal operation for differing load conditions.

Thus, it is possible to detect an overload condition by means of the second comparator 33 which receives, at the non inverting input, the reference voltage VREF2, VREF2 is higher than VREF1 and suitably selected to cause the comparator to toggle when the charge level of capacitor 27 is related to an overload condition.

It is however required to discriminate overload conditions from the inoperative state of circuit 4, which also leads to a dropping of the charge voltage and to the intervention of comparator 33 first, then of comparator 32.

The logic unit 34 and the timing unit related thereto provide such discrimination, The operation of logic unit 34 can be better understood with reference to the operative flow diagram of FIG. 5, rather than with reference to circuital embodiments, which can take several forms.

It is of essence to premise that in overload conditions the charge voltage of capacitor 27 decreases but does not drop to a zero level, as it occurs in case of non operation of the circuit 4, where the charge voltage of capacitor 27 drops exponentially down to zero and at least after a certain time from the discharge beginning attains low voltage levels which are not attained in overload current limiting conditions.

Therefore when the comparator 33 asserts signal ALARM2, the logic unit 34 start a discrimination and protection procedure (block 50: START).

The first performed operation is masking of the input to the procedure until is it completely performed and to display the alarm situation (block 51: LOCK START, DISPL ALARM 2).

The timer is triggered to measure a predetermined time interval, for instance 200 msec (block 52: RUN TIM) at the end of which (block 53: TIM END) it is checked if the signal in output from comparator 32 has been asserted (block 54:ALARM1 ?).

If signal ALARM1 is asserted, this means that the charge voltage of capacitor 27 has further dropped at a level which is attained only in case the power factor correction circuit is not operative.

Therefore the logic unit 34 switches off the overload alarm display and switches on the power factor correction failure alarm display (block 55: RST ALARM 2, DISPL ALARM1, START TIM).

It further triggers the timer 35 to measure a predetermined time interval, within which a possible intervention of an operator is waited for (for example the intervention may consist in the switching off of the power supply).

Once the predetermined time interval has elapsed, (block 56: TIM END), the logic unit 34 checks if alarm signal ALARM1 in output from comparator 32 is still asserted and therefore the misfunction is not of a transitory nature (block 57: ALARM1).

If the signal is deasserted, the logic unit 34 controls the switching off of the alarm display (block 58: SW OFF DISPL), removes the lock to the procedure input (block 59: UNLOCK START) and ends the procedure (block 60: END).

If the signal is asserted, it controls the deactivation of the powered equipment 20 (block 61: DIS EQUIP) the deactivation of circuit 4 which is already misfunctioning (block 62: DIS PFC) and the switching off of breaker 26, with the consequent deactivation of the power supply (block 63: DIS P.S.).

Then the procedure is ended (block 60: END).

Block 54 is now considered again: if signal ALARM1 has not been asserted within a predetermined time interval, this means that the charge voltage drop of capacitor 27 is due to an overload.

In this case it is first checked that the overload situation is persistent (block 64: ALARM2?) if ALARM2 is no more asserted, that means that the overload ended and there is no more reason to perform precautionary disabling operations.

Therefore an alarm display 37 is switched off (block 65: SWITCH OFF DISPL 37) the input lock to the procedure is reset (block 59: UNLOCK START) and the procedure is ended.

If on the contrary the signal ALARM2 is still asserted (block 64) that means that the overload is persisting and, as a precautionary measure, the switch off procedure, already considered with reference to blocks 61,62,63,60 is performed.

It is clear that the described system does not provide and cannot provide a timely protection in case of overload resulting from a short (consequent for instance to the permanent switch on of switch 6).

The known protection such as fuses 38,39 and the breaker 26, make up with their intervention to this danger situations requiring immediate intervention.

the preceding description reference has been made to operative conditions in which the charge voltage VCC of capacitor 2 is higher than the peak voltage VOMAX in output from bridge 1.

If for any reason, for instance the missing operation of circuit 4, the voltage VCC falls below VOMAX, during the whole time interval in which VO>VCC, the diode 7 is forward biased and a current pulse can flow in the inductor 5 towards comparator 2, possibly bringing the inductor 5 into saturation, with very high current peaks even if the average current level is within the operating limit.

The average voltage induced in winding 17, under these conditions is due to periodical voltage pulses corresponding to the magnetization and demagnetization of the inductor (preceding and following a saturation time interval, if the current reaches the saturation level) having the same period of the half waves of voltage VO (10 msec).

This average voltage, although very low, prevents capacitor 27 from discharging with the same rate corresponding to the change from an operative condition of the circuit 4 to the non operative state.

The discharging rate is lowered and reliable discrimination between an overload situation and the non operative state of the power factor correction circuit requires more time.

To avoid this disadvantage and to make the discrimination faster, the power supply of FIG. 2 is provided with a diode 30 having the anode coupled to the positive output of bridge 1 and cathode coupled to the positively charged armature of capacitor 2.

The diode 30 provides a by pass of inductor 5, active every time voltage VO exceeds the charge voltage of capacitor 2.

Therefore diode 30 advantageously allows the current supplied by bridge 1 to directly flow towards capacitor 2, avoiding power waste in the inductor 5 both at the switch on of the power factor correction circuit, both in case of its failure to operate, when voltage VCC, dropped to VOMAX, tends to further decrease.

The preceding description relates to a preferred form of embodiment of the invention and several changes can be made.

For example the charge voltage VCC relative to ground may be negative, and this requires the reversal of the connection with the bridge 1 outputs and the polarity reversal of the diodes.

The capacitor 27 may be coupled to the outputs of bridge 18 through the interposition of a resistor to increase the time constant of the integrating network; the buffer 29 may be superfluous if the comparators 32,33 have a high input impedance and the two comparators 32,33 may consist in a single comparator to which either one or the other of two or more reference voltages is applied at different times and on command from the logic unit 34.

I claim:

1. Power supply of the "boost" pre-regulation type with power supply factor correction comprising:

a first rectifying bridge having an input and an output feeding a tank capacitor through an inductor and a first diode series connected to said capacitor, modulation means of the current in said inductor periodically switching on a switch shorting said inductor on the output of said first bridge, an auxiliary winding magnetically coupled to said inductor, and a second rectifying bridge having inputs coupled to said auxiliary winding and outputs, further comprising:

an integrating capacitor coupled to the outputs of said second bridge and shunted by a discharging resistor, and first means coupled to said integrating capacitor for comparing the charge voltage of said integrating capacitor with a first reference voltage and asserting a first signal indicative of the missing operation of said current modulation means when said charge voltage is lower than said first reference voltage.

2. Power supply as in claim 1 comprising a second diode bypassing said inductor coupled in parallel to said inductor and said first diode and conductive in the same direction as said first diode.

3. Power supply as in claim 1 comprising second means for comparing the charge voltage of said integrating capacitor with a second reference voltage greater than said first reference voltage and asserting a second signal indicative of an overload of said power supply.

4. Power supply as in claim 3 comprising logic and timing means receiving as input said first and second signal for detecting if said first signal is asserted within a predetermined delay time relative to the assertion of said second signal.

5. Power supply as in claim 4, said logic and timing means comprising means for executing a switch off procedure of said power supply if said first signal is not asserted within a predetermined time interval from the assertion of said second signal.

* * * * *